UNITED STATES PATENT OFFICE.

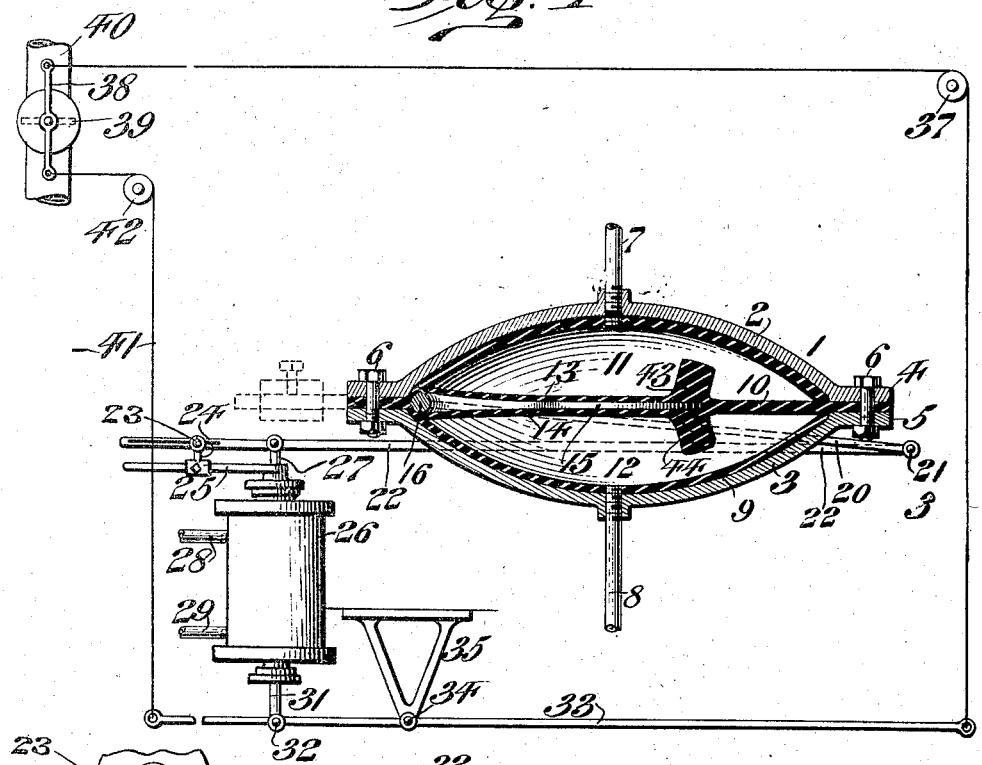

FRANCIS H. BROWN, OF PHILADELPHIA, PENNSYLVANIA.

FLUID-PRESSURE REGULATOR.

939,470.                Specification of Letters Patent.      Patented Nov. 9, 1909.
Application filed November 11, 1908. Serial No. 462,001.

*To all whom it may concern:*

Be it known that I, FRANCIS H. BROWN, a citizen of the United States, residing in the city and county of Philadelphia, State of Pennsylvania, have invented a new and useful Fluid-Pressure Regulator, of which the following is a specification.

My present invention consists of a novel construction of an automatic fluid pressure regulator which is extremely sensitive and which actuates in a very reliable manner under a very slight variation in pressure.

It further consists of a novel construction of a fluid pressure regulator in which the actuating arm or member is in engagement with the diaphragm so as to move in unison therewith and in which said lever is so fulcrumed and balanced that the great weight which the diaphragm is obliged to move in devices of this kind as ordinarily constructed is dispensed with and a very slight variation in pressure will actuate the arm and the end of the arm contacting with the diaphragm will move in the arc of a circle instead of a straight line as in prior devices with which I am familiar.

It further consists of a novel construction of a fluid pressure regulator, in which weights and counterweights are dispensed with, consisting of a casing provided with a flexible diaphragm forming thereby two independent compartments one of which is adapted to be connected with fluid under a constant pressure, the other compartment thereof being adapted to be connected with the controlling medium, means being provided for actuating any desired mechanism in unison with the movement of the flexible diaphragm and means being also provided for limiting the movement of such diaphragm in either direction.

It further consists of other novel features of construction, all as will be hereinafter fully set forth.

For the purpose of illustrating my invention, I have shown in the accompanying drawings one form thereof which is at present preferred by me, since the same gives in practice satisfactory and reliable results, although it is to be understood that the various instrumentalities of which my invention consists can be variously arranged and organized and that my invention is not limited to the exact arrangement and organization of these instrumentalities as herein set forth.

Figure 1 represents a sectional elevation of a regulating mechanism embodying my invention, showing the same as operatively connected with a valve and provided with a motor for controlling said valve and controlled by said regulating mechanism. Fig. 2 represents a plan view of Fig. 1.

Similar numerals of reference indicate corresponding parts in the figures.

Referring to the drawings. 1 designates a sectional casing the sections 2 and 3 of which are provided with flanges 4 and 5 which are secured together by suitable fastening devices such as the bolts and nuts 6.

7 designates a conduit extending through the casing member 2 and communicating with any suitable fluid under pressure.

8 designates a conduit extending through the casing section 3 and communicating with the steam or other fluid pressure which it is desired to regulate.

For the purpose of illustration, I have preferred to show in the present instance, a flexible container 9 composed of rubber or other suitable material and provided with a central diaphragm 10, thereby dividing the container 9 into the two independent compartments 11 and 12. The arm or member 15 may be movably secured to the central diaphragm 10 in any desired manner and in the present instance, I have shown the central diaphragm 10 as being split in order to form the two flaps 13 and 14 between which is inserted the arm or member 15. The arm 15 is rigidly secured to the shaft 16 which is journaled in an enlargement 17 on the upper casing section 2.

18 designates an arm mounted on the shaft 16 in any suitable manner, said arm having adjustably mounted thereon a counterbalance 19.

20 designates an arm, one end of which is adjustably secured on the shaft 16 the other end thereof being pivoted by means of a pin 21 to one end of a lever 22, the other end of said lever 22 being adjustably pivoted at 23 by means of a block 24 adjustably secured to an apertured arm 25 carried by the motor casing 26. The motor shown in the present instance corresponds to a well known device, although it is to be understood that any other type of motor mechanism may be employed either electrical or otherwise and since the motor shown is a well known type, I have deemed it unnecessary to give a detailed description thereof, since the same forms *per se* no part of my present invention.

27 designates a valve stem which controls a valve within the casing 26 to admit motive fluid to move a piston within the casing 26, said piston having pivoted thereto a piston rod 31 pivoted at 32 to the lever 33 which latter is fulcrumed at 34 to a suitable fixed point such as the bracket 35.

36 designates a cable passing over the pulley 37 and connected with one end of a lever 38 secured to a damper or valve 39 located in the conduit 40.

41 designates a cable one end of which is secured to the lever 33, said cable passing over a pulley 42 and having its other end connected with the lever 38 as will be readily understood from Fig. 1.

The diaphragm 10 is preferably provided with lugs 43 and 44 on opposite sides thereof, these lugs being made preferably of resilient material and serving to limit the movement of the diaphragm 10 in either direction, since if some device is not employed for limiting the movement of the diaphragm, the latter would be liable to injury if the fluid pressure supply to one of the compartments 11 or 12 should be suddenly cut off.

The operation of my novel construction of fluid pressure regulator will now be readily apparent to those skilled in this art and is as follows:—The compartment 11 is supplied with air or other fluid under a constant pressure and the compartment 12 with fluid under a variable pressure. When the pressure of the fluid in the compartment 12 increases or diminishes the diaphragm 10 will be correspondingly actuated thereby rocking the arm 15 and the shaft 16 and causing the arm 20 to rock the lever 22, whereupon the valve stem 27 is actuated and fluid under pressure will be admitted or discharged from the conduits 28 and 29 so that the piston rod 31 will actuate the lever 33, and owing to the cables 36 and 41 being operatively connected with the valve rod 38, the valve 39 within the conduit 40 will be regulated in unison with the movement of the diaphragm 10.

It is to be understood that in the specification and claims where I speak of a pressure regulator, this term is to be construed in its broadest scope as including a regulator which may be used either dynamically or statically. My novel regulator may be employed as the prime mover for operating and controlling any desired mechanism, or it may be acted upon to receive or compensate shocks or vibration of a load, or it may be employed as a regulating device to produce a uniform speed of the operating mechanism or to maintain a uniform condition of fluid pressure or equivalent purposes, without departing from the spirit or scope of my invention.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In combination, a diaphragm casing, a diaphragm therein subject to pressure on both sides, a rotary shaft mounted in the casing, and an arm directly connecting said diaphragm to said shaft and moving in the arc of a circle.

2. In a device of the character described, the combination of a movable member subject to pressure on both sides, and a second member suitably fulcrumed and having one end directly contacting with the movable member whereby the contacting end moves in the arc of a circle.

3. In a device of the character described, the combination of a movable member subject to pressure on both sides, a second member suitably fulcrumed and having one end directly contacting with the movable member whereby said contacting end moves in the arc of a circle, a counterbalance for said second member, and mechanism operatively connected with said second member.

4. In a fluid pressure regulator, a rigid container, a flexible container therein having two independent compartments and a diaphragm separating said compartments, a pivoted arm having one end always in contact with said diaphragm, means for admitting a constant fluid pressure to one of said compartments, and means for admitting a variable fluid to the other of said compartments.

5. In a fluid pressure regulator, a rigid container, a flexible container therein having two independent compartments and a diaphragm separating said compartments, a pivoted arm having one end always in contact with said diaphragm, means for admitting a constant fluid pressure to one of said compartments, means for admitting a variable fluid to the other of said compartments, and means for limiting the movement of said diaphragm in either direction.

6. In a fluid pressure regulator, a diaphragm suitably supported, and a lever having one end actuated by said diaphragm and moving in unison therewith, said lever being fulcrumed so that said end actuated by the diaphragm travels in the arc of a circle.

7. In a fluid pressure regulator, a diaphragm having a portion thereof split, and a pivoted arm having one end inserted in said split portion, said diaphragm being acted upon in one direction by a constant pressure, and in the opposite direction by a variable pressure.

8. In a fluid pressure regulator, a rigid container, a flexible container therein having a diaphragm forming two sealed compartments, a pivoted arm having one end in frictional engagement with said diaphragm, means for admitting a constant pressure to one of said compartments, and means for admitting a variable pressure to the other of said compartments.

9. In a fluid pressure regulator, a rigid container, a flexible container therein having a diaphragm forming two sealed compartments, said diaphragm having a portion thereof in two parts, a pivoted arm having one end extending between said parts and moving in unison with said diaphragm, means for admitting a constant fluid pressure to one of said compartments, and means for admitting a variable pressure to the other of said compartments.

10. In a device of the character described, a container, a diaphragm therein dividing the latter into two compartments, each of which has fluid pressure therein, a member movably supported and having one end engaging the diaphragm and moving in unison therewith, said end moving in the arc of a circle, and a load controlled by said member whereby any movement of the load is resisted by the pressure on opposite sides of the diaphragm.

11. In a device of the character described, a container, a diaphragm therein dividing the container into two independent compartments, each compartment having fluid pressure therein, a member movably mounted and having one end in engagement with the diaphragm, whereby a variation of pressure in said compartments causes said end to move in unison therewith and in the arc of a circle, and mechanism actuated by said member.

12. In a fluid pressure regulator, a container, a diaphragm therein dividing the container into two compartments adapted to receive fluid pressure, a member movably mounted and having one end in engagement with the diaphragm, whereby a variation of pressure in the compartments causes said end to move in unison therewith and in the arc of a circle, and a motor actuated by said member.

FRANCIS H. BROWN.

Witnesses:
H. S. FAIRBANKS,
C. D. McVAY.